US012784364B2

(12) United States Patent
Shwartz et al.

(10) Patent No.: US 12,784,364 B2
(45) Date of Patent: Nov. 3, 2026

(54) ALGORITHM FOR 3D RECONSTRUCTION OF DIAGONALLY CUT SEMICONDUCTOR LOGIC STRUCTURE

(71) Applicant: Applied Materials Israel Ltd., Rehovot (IL)

(72) Inventors: Guy Shwartz, Ramat-Gan (IL); Ohr Lahad, Rehovot (IL); Eran Erdal, Messilat Zion (IL); Ido Almog, Rehovot (IL); Lior Yaron, Ness Ziona (IL); Ching-Hung Lai, Hsinchu (TW); Ron Bar-Or, Ramat-Gan (IL)

(73) Assignee: Applied Materials Israel Ltd., Rehovot (IL)

( * ) Notice: Subject to any disclaimer, the term of this patent is extended or adjusted under 35 U.S.C. 154(b) by 166 days.

(21) Appl. No.: 18/754,131

(22) Filed: Jun. 25, 2024

(65) Prior Publication Data

US 2025/0391114 A1 Dec. 25, 2025

(51) Int. Cl.
*G06T 17/20* (2006.01)
*G06T 7/00* (2017.01)
(Continued)

(52) U.S. Cl.
CPC ............ *G06T 17/20* (2013.01); *G06T 7/0004* (2013.01); *G06T 7/50* (2017.01); *G06T 7/62* (2017.01); *G06T 2207/10028* (2013.01); *G06T 2207/10061* (2013.01); *G06T 2207/30148* (2013.01); *G06T 2210/56* (2013.01)

(58) Field of Classification Search
CPC ......... G06T 17/20; G06T 7/0004; G06T 7/50; G06T 7/62; G06T 2207/10028; G06T 2207/10061; G06T 2207/30148; G06T 2210/56; G06T 17/00
See application file for complete search history.

(56) References Cited

U.S. PATENT DOCUMENTS 10,670,393 B1 6/2020 Subrahmanyan
11,092,433 B2 8/2021 Subrahmanyan
(Continued)

FOREIGN PATENT DOCUMENTS

CN 106844983 B * 7/2021 ............. G06F 30/20
EP 1746386 A2 1/2007
(Continued)

OTHER PUBLICATIONS

Lorusso, et al., "Enabling CD SEM Metrology for 5nm Technology Node and Beyond", Proceedings of SPIE 10145, Metrology, Inspection, and Process Control for Microlithography XXXI, 1014512, 2017, pp. 1-10.
(Continued)

*Primary Examiner* — Haixia Du
(74) *Attorney, Agent, or Firm* — Kilpatrick Townsend & Stockton LLP

(57) ABSTRACT

A method for generating a 3D reconstruction of structural elements of a wafer including: obtaining a 2D image of a top view of the plurality of structural elements, sectioned diagonally in a compound angle allowing 3D volumetric sampling, such that each of the plurality of structural elements is cut at a different height thereof, and generating a representative 3D reconstruction of the structural elements, based on the images.

14 Claims, 9 Drawing Sheets

(51) Int. Cl.
*G06T 7/50* (2017.01)
*G06T 7/62* (2017.01)

(56) References Cited

U.S. PATENT DOCUMENTS

| | | | | |
|---|---|---|---|---|
| 11,280,749 | B1 | 3/2022 | Zur et al. | |
| 11,713,964 | B1 | 8/2023 | Goldovsky et al. | |
| 11,728,126 | B2 | 8/2023 | Blayvas | |
| 2014/0192234 | A1* | 7/2014 | Christoph | H04N 23/951 348/239 |
| 2018/0350558 | A1 | 12/2018 | Franco et al. | |
| 2019/0147586 | A1* | 5/2019 | Ikeda | G06T 7/0004 382/157 |
| 2020/0135427 | A1 | 4/2020 | Vystavel et al. | |
| 2021/0350999 | A1* | 11/2021 | Fukuda | G01N 1/28 |
| 2022/0392793 | A1* | 12/2022 | Buxbaum | H01J 37/265 |
| 2023/0019567 | A1 | 1/2023 | Mairov et al. | |
| 2023/0317410 | A1 | 10/2023 | Wu et al. | |
| 2024/0136150 | A1 | 4/2024 | Zur | |
| 2025/0391707 | A1 | 12/2025 | Eytan et al. | |

FOREIGN PATENT DOCUMENTS

| | | | |
|---|---|---|---|
| WO | 2014055982 | A1 | 4/2014 |
| WO | 2021180600 | A1 | 9/2021 |
| WO | 2023048958 | A1 | 3/2023 |
| WO | 2023151946 | A1 | 8/2023 |

OTHER PUBLICATIONS

Nakatsuru, et al., "Investigation of three dimansional structure by an orthogonally arranged FIB-SEM", Hitachi High-Technologies Europe GmbH, DE / Hitachi High-Tech Science Co., JP, 2019, pp. 1-2.

Takamasu, et al., "3D-profile measurement of advanced semiconductor features by using FIB as reference metrology", Proceedings of SPIE 10145, Metrology, Inspection, and Process Control for Microlithography XXXI, 101451A, 2017, pp. 1-10.

U.S. Appl. No. 18/754,126, "Non-Final Office Action", Jul. 15, 2026, 10 pages.

* cited by examiner

ALGORITHM FOR 3D RECONSTRUCTION OF DIAGONALLY CUT SEMICONDUCTOR LOGIC STRUCTURE

TECHNICAL FIELD

The present disclosure relates generally to an algorithm that converts a 2D SEM image of a diagonally cut structure into a 3D reconstruction.

BACKGROUND OF THE INVENTION

Scanning electron microscope (SEM) produces images of a sample (such as wafer samples) by scanning the surface with a focused beam of electrons. The electrons interact with atoms in the sample, producing various signals that contain information about the surface topography and composition of the sample. However, due to the 3D structure trend of the wafer industry and the 2D imaging nature of the SEM, a solution allowing volumetric sampling of wafers is required.

Solutions to 3D volumetric sampling have been developed such as CD-SAXS, optical scatterometry and TEM. However, the current solution either:

1. Do not cover the whole application space: CD-SAXS (logic), TEM (Memory), Scatterometry (Memory and partially logic); and/or
2. Take long time to results (TEM and CD-SAXS), and/or
3. Are destructive (the whole wafer is scrapped) and cannot be conducted in-line.

Focused ion beam, also known as FIB, is an example of a technique used particularly in the semiconductor industry. While the SEM uses a focused beam of electrons to image the sample in the chamber, a FIB setup uses a focused beam of ions instead. FIB can also be incorporated in a system with both electron and ion beam columns, allowing the same feature to be investigated using either of the beams.

The FIB can be operated at low beam currents for imaging or at high beam currents for site specific sputtering or milling. However, unlike SEM, FIB is inherently destructive to the specimen.

At low primary beam currents, very little material is sputtered, allowing FIB systems to achieve a 5 nm imaging resolution. At higher primary currents, a great deal of material can be removed by sputtering, allowing precision milling of the specimen down to a sub micrometer or even a nano scale.

Until recently, the overwhelming usage of FIB has been in the semiconductor industry. Such applications as defect analysis, circuit modification, photomask repair and transmission electron microscope (TEM) sample preparation of site specific locations on integrated circuits have become commonplace procedures.

The latest FIB systems have high resolution imaging capability; this capability coupled with in situ sectioning has eliminated the need, in many cases, to examine FIB sectioned specimens in a separate SEM instrument. SEM imaging is still required for the highest resolution imaging and to prevent damage to sensitive samples.

A combination of SEM and FIB columns onto the same chamber has been disclosed, however till today SEM-FIB imaging is both destructive and time consuming.

There therefore remains a need for a tool which enables high-resolution, 3D volumetric inspection of 3D structural elements, which tool is fast, and preferably sufficiently non-destructive to be incorporated in line.

BRIEF SUMMARY OF THE INVENTION

The present disclosure relates generally to an algorithm that converts a 2D image into a 3D reconstruction. The algorithm input is a 2D image, for example a SEM image an AFM image or an EDX image of a cut at a compound angle wafer structure (or any combination thereof). The output is a single 3D reconstruction of a unit cell of the milled wafer structure. Additionally or alternatively, the output can be 2D section view images (along any arbitrary plane) of the reconstructed periodic structure. In addition, the algorithm can perform measurements on the reconstructed structure, as well as on the raw image, in order to characterize and/or inspect its quality of the wafer structure and detect variations occurred during the manufacturing process.

According to some embodiments, the algorithm disclosed herein, may receive as an input one or more images of an area of a wafer including periodic structural elements. The one or more images are captured after the 3D structural elements are milled diagonally at a predetermined compound angle, such that each of the periodic 3D structural elements are cut at different heights thereof, thereby exposing layers of the periodic 3D structure at different depths thereof. Based on the one or more images, the algorithm can advantageously reconstruct the 3D structural element by combining/assembling the layers of the plurality of structures, each layer showing a different depth of the structure. This advantageously allows characterization of the 3D structural elements, at different depths thereof, while sacrificing only a relatively small area of the wafer. Moreover, it also allows characterization of the 3D structural elements, at different depths thereof, while performing only a single diagonal cut, thereby significantly reducing time-to-results.

Accordingly, based on a single cut in one or more areas of the wafer, and a single 2D image (per area) of the 3D structure on a wafer, the structure can be inspected at high resolution (~1 nm), while sacrificing only a small (negligible) area of the wafer (e.g., less than 5% of the wafer).

According to some embodiments, the algorithm disclosed herein, may receive as an input a plurality of images of an area of a wafer including periodic structural elements. In this case an image is captured after each of a plurality of diagonal cuts, also referred to herein as "sequential delayering" and "delayering". According to some embodiments, the sequential delayering can advantageously increase the reconstruction resolution and/or statistics, as compared to a single cut.

Advantageously, once the structural element has been reconstructed (also referred to herein as a "section view"), the algorithm can execute various volumetric measurement in order to determine a characteristic and/or dimension of the 3D structural elements and/or the component thereof (e.g., a nanosheet width or thickness of a gate-all-around (GAA) transistor).

According to some embodiments, based on the volumetric measurements a quality/attribute of the manufacturing process of the wafer can be determined.

According to some embodiments, the algorithm can advantageously be applied in-line to the manufacturing process, thus providing a 3D resolution resembling critical dimension (CD) SEM in three dimensions (or similar) in a short and efficient manner.

That is, the herein disclosed method advantageously has the ability to fully reconstruct a 3D volume of a structure and conduct measurements with a 3D resolution of ~1 nm.

According to some embodiments, this disclosure provides a method for generating a representative 3D reconstruction of a plurality of periodic structural elements of a wafer, the method including: obtaining a 2D image of a top view of the plurality of structural elements, sectioned diagonally in a compound angle allowing 3D volumetric sampling, such that each of the plurality of structural elements is cut at a different height thereof, and generating a representative 3D reconstruction of the structural elements, based on the images.

According to some embodiments, prior to the cutting a rotational plane (ψ) may be selected/set. According to some embodiments, the rotational angle (ψ) may be set/selected based on one/or features of the structural element and or portions thereof, e.g., based on their height, width substructures or the like. According to some embodiments, the rotational angle (ψ) may be changed/adjusted between different cuts to thereby expose different rotational planes thereof.

According to some embodiments, the method further includes generating a point cloud based on the 2D coordinates of each pixel in the image, and on one or more known parameters related to a plane of the diagonal cut relative to the plurality of structural elements, wherein each point in the point cloud at least represents the position of each pixel in a 3D space, grey level (GL) thereof; creating at least one GL reconstructed image of a section view of the point cloud; and performing, on the at least one GL reconstructed image, one or more volumetric measurements to characterize the plurality of structural elements or one or more components thereof.

According to some embodiments, the method includes segmenting the GL reconstructed image using an image analysis algorithm to identify one or more components of the plurality structural elements.

According to some embodiments, imaging of the top view of the diagonal cut is performed using a scanning electron microscope (SEM) an atomic force microscope (AFM) or focused ion beam (FIB) imaging. Each possibility is a separate embodiment. According to some embodiments, the SEM is cold field emission (CFE)-SEM. Advantageously, using CFE-SEM may allow measuring the surface with low-energy electrons, and in turn advantageously provide high depth resolution, and high lateral-resolution-SEM imaging.

According to some embodiments, creating the reconstructed image of the section view includes: sorting the points in the point cloud along a 3D mesh with a coarse resolution; for each pixel, finding closest surrounding points in the point cloud within a predefined radius; and calculating an output pixel GL, based on the surrounding points. According to some embodiments, calculating the output pixel GL includes linear interpolation between the closest surrounding points.

According to some embodiments, the method further includes preprocessing the obtained 2D image and performing measurements thereon.

According to some embodiments, the method further includes generating a 2D and/or 3D model of the plurality of structural elements, based on multiple section views derived from the point cloud.

According to some embodiments, the one or more volumetric measurements include a width of a structure, a layer thickness, a height of a structure, a recess of a layer, a radius of a structure, an angle of a structure or any combination thereof. Each possibility is a separate embodiment.

According to some embodiments, the method further includes determining a quality/attribute of a wafer production line, based on the volumetric measurements.

According to some embodiments, the method is suitable for in-line implementation into the wafer production line, i.e., the method may be conducted via one stand-alone tool, thus ensuring an integrative and streamlined process.

According to some embodiments, the plurality of structural elements are cut diagonally at least twice, wherein each subsequent of the diagonal cuts is performed at a deeper plane than a preceding diagonal cut. According to some embodiments, obtaining the top view of the diagonal cut includes obtaining a top view image after each diagonal cut According to some embodiments, generating the point cloud is based on the 2D coordinates of all pixels in the obtained 2D images of each diagonal cut. According to some embodiments, the distance between each of the diagonal cuts is about 5-10 nm.

According to some embodiments, the method further includes cross-registration of the top view images of each of the diagonal cuts. According to some embodiments, the registration includes utilizing one or more marks on the wafer, algorithmic correlation between the top view images, navigation data for each of the top view images or any combination thereof.

According to some embodiments, the disclosure provides a system for generating a representative 3D reconstruction of a plurality of periodic structural elements of a wafer, the system including a processing circuitry configured to: obtain a 2D image of a top view of the plurality of structural elements, sectioned diagonally in a compound angle allowing 3D volumetric sampling, such that each of the plurality of structural elements is cut at a different height thereof, and generate a representative 3D reconstruction of the structural elements, based on the images.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles “a” and “an” mean “at least one” or “one or more” unless the context clearly dictates otherwise.

Unless specifically stated otherwise, as apparent from the disclosure, it is appreciated that, according to some embodiments, terms such as “processing”, “computing”, “calculating”, “determining”, “estimating”, “assessing”, “gauging” or the like, may refer to the action and/or processes of a computer or computing system, or similar electronic computing device, that manipulate and/or transform data, represented as physical (e.g., electronic) quantities within the computing system’s registers and/or memories, into other data similarly represented as physical quantities within the computing system’s memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure.

For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

Figure 1A:
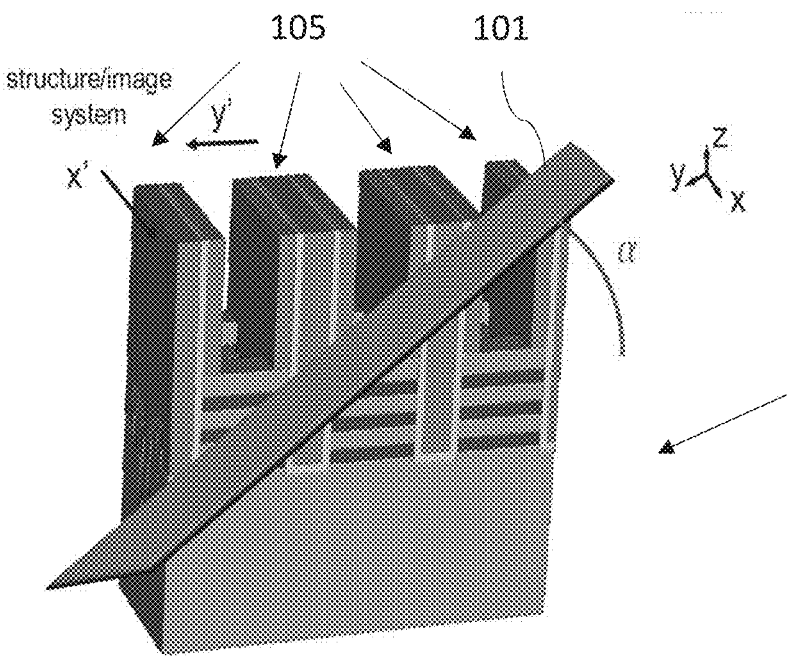
Figure 1B:
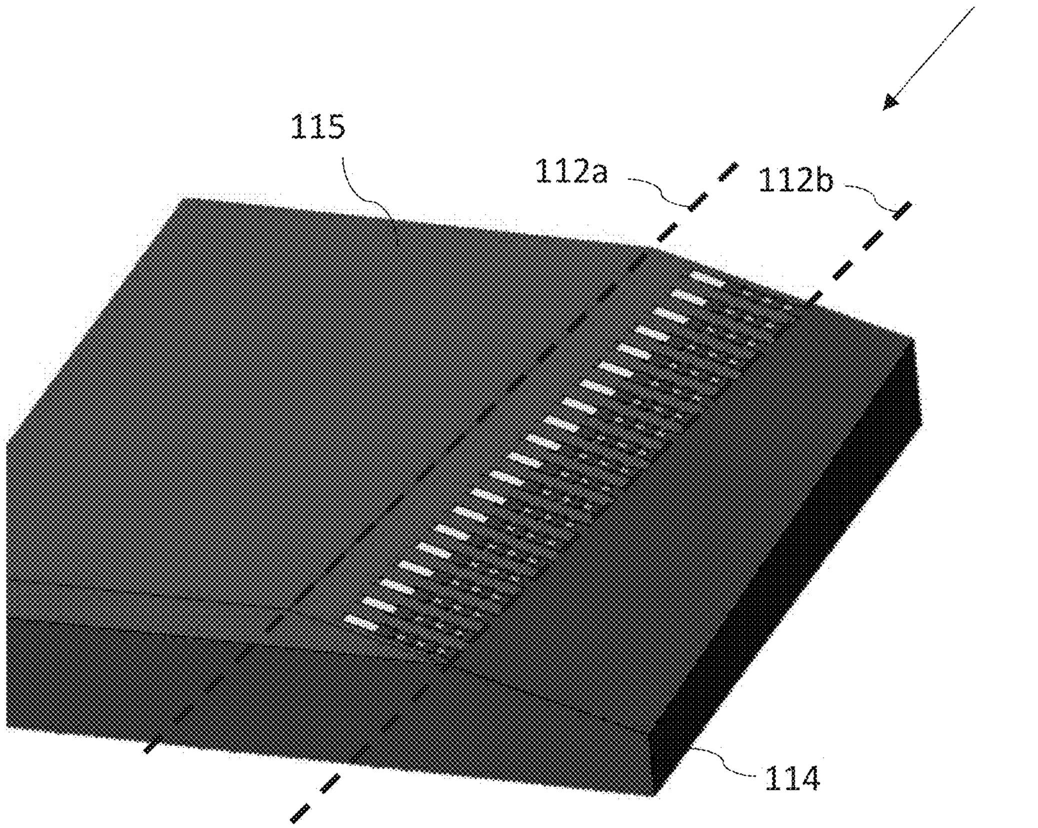
Figure 2A:
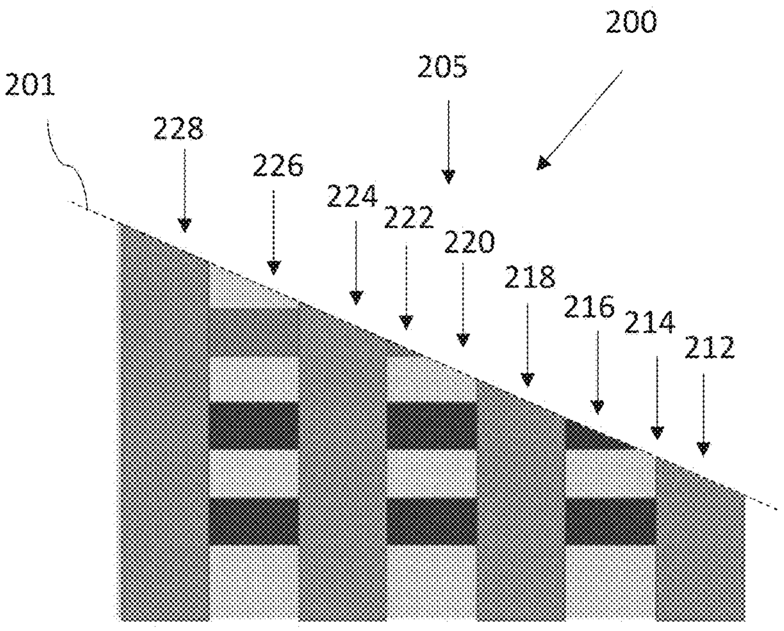
Figure 2B:
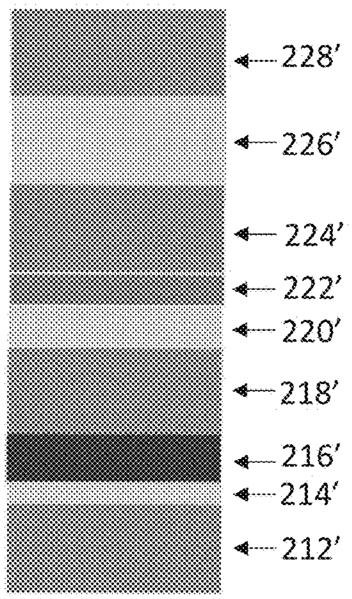
Figure 3:
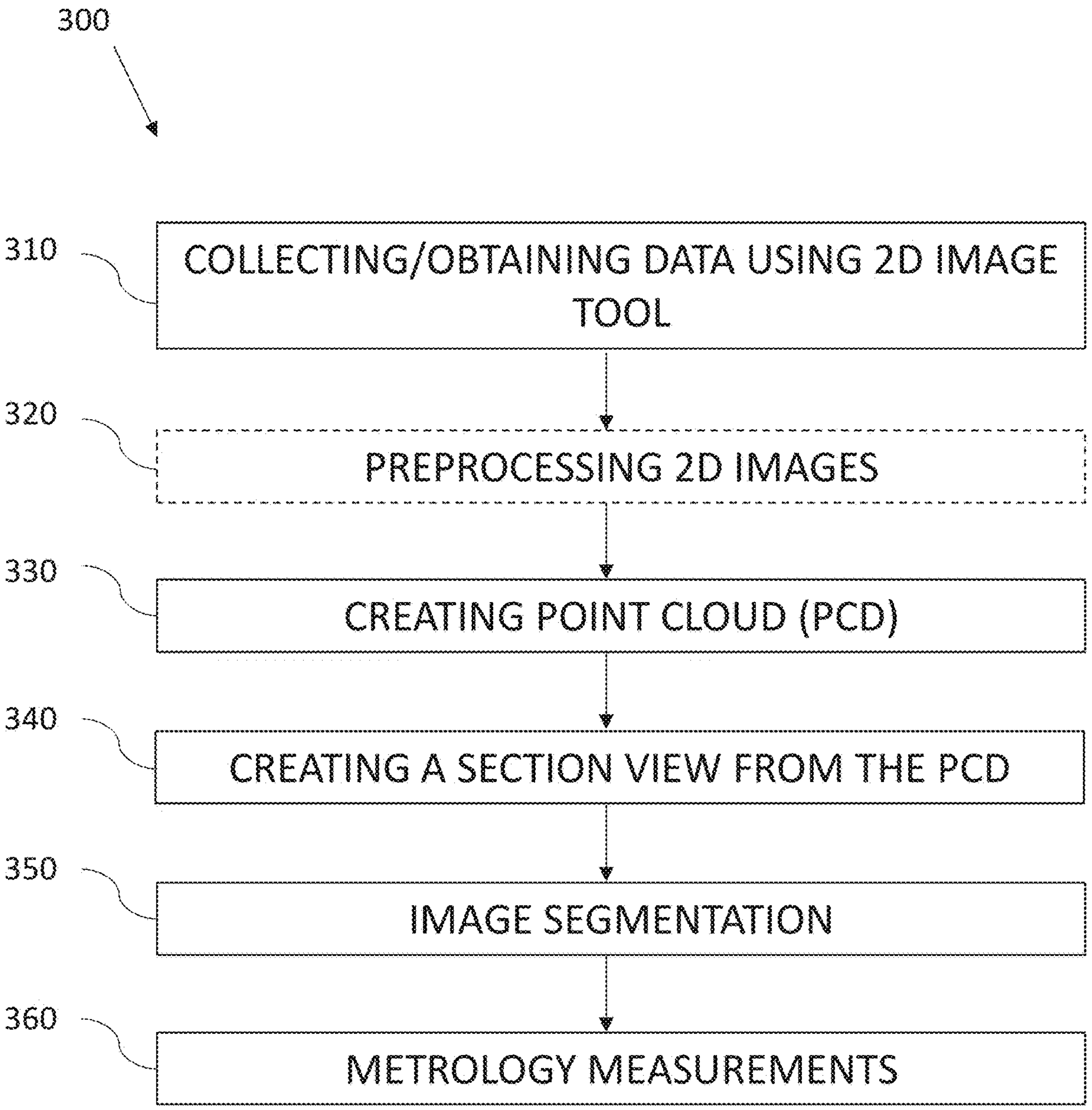
Figure 4A:
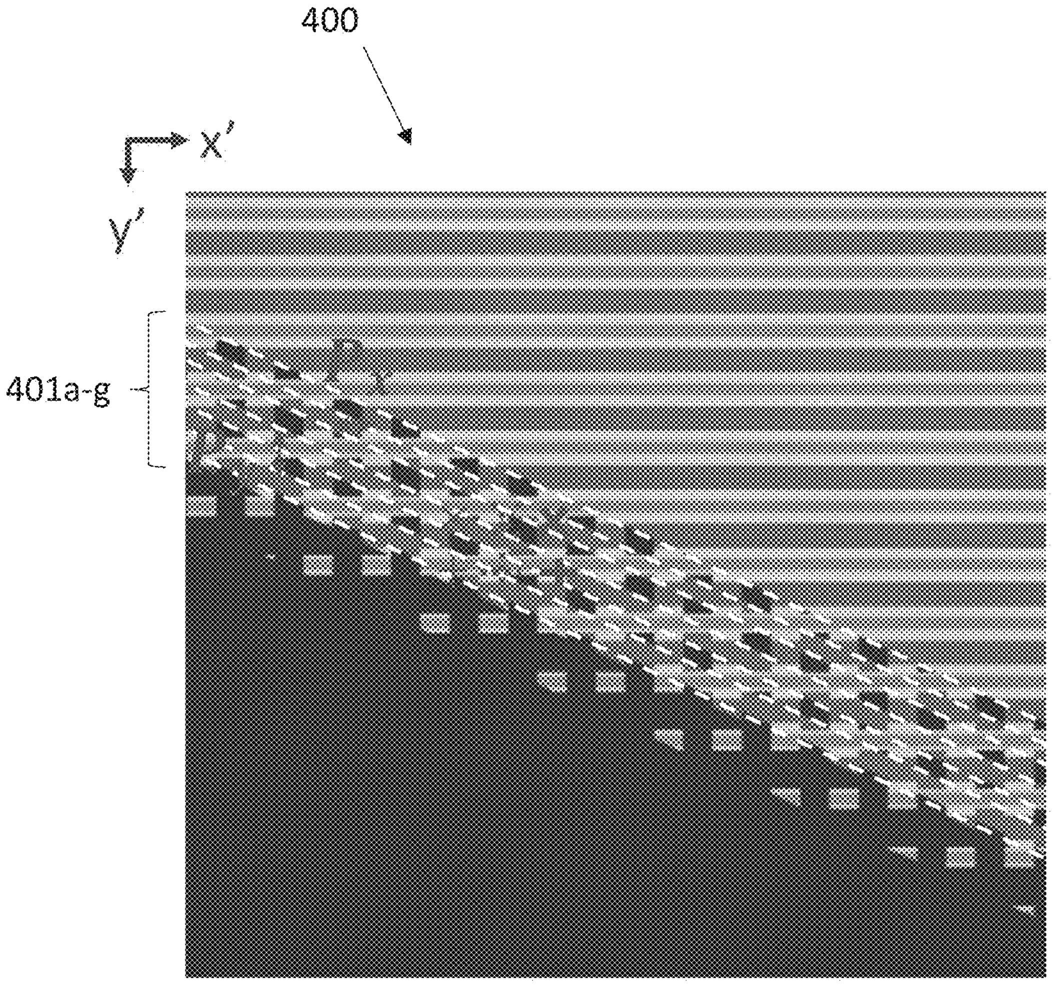
Figure 4B:
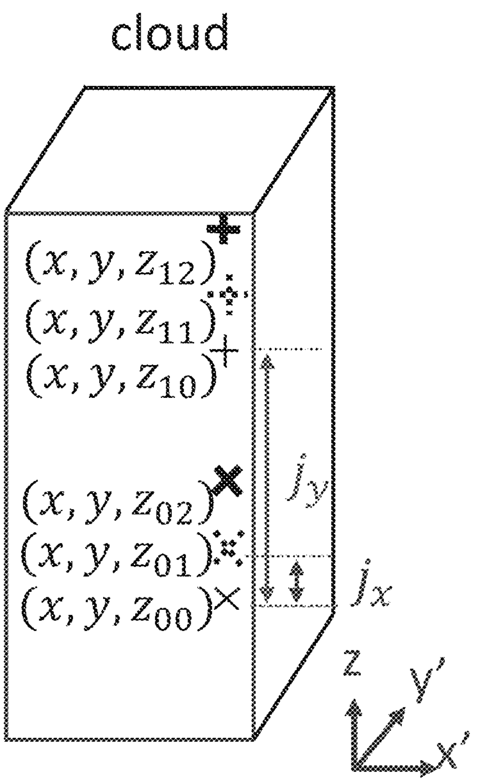
Figure 4C:
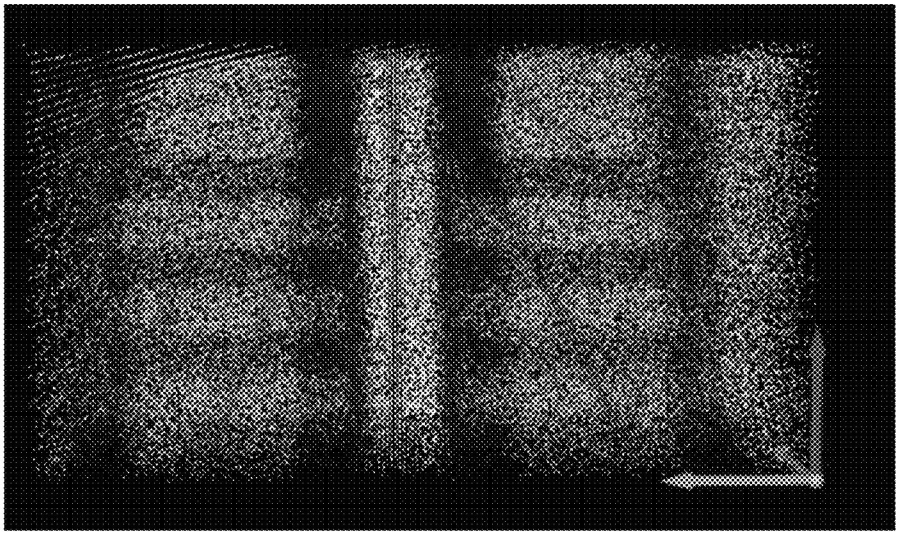
Figure 4D:
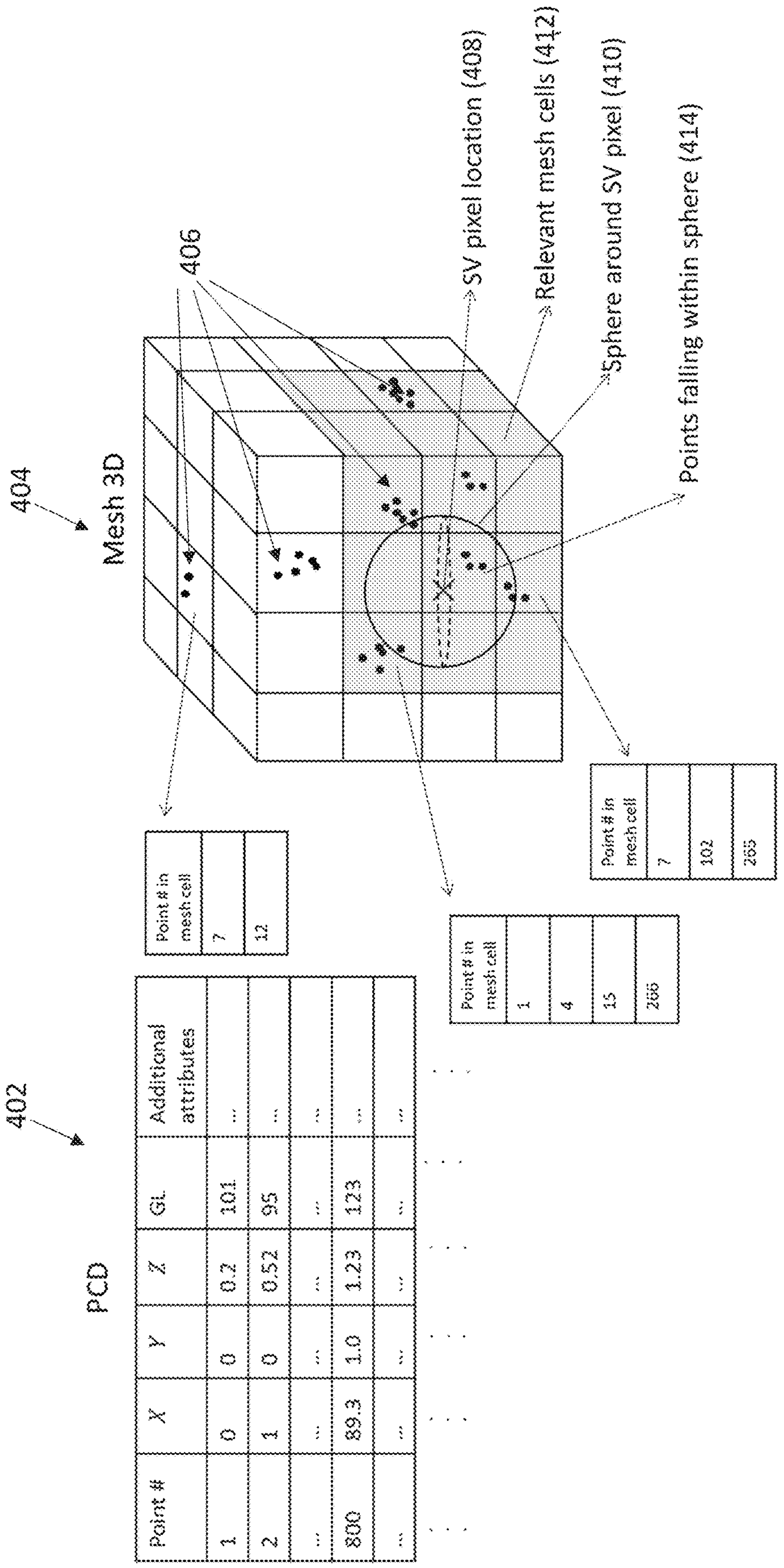
Figure 4E:
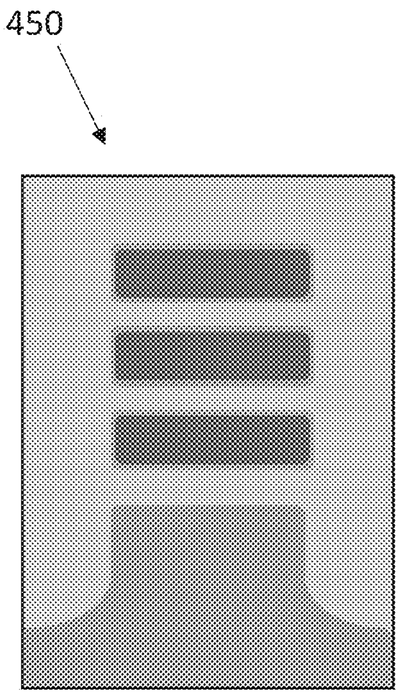
Figure 4F:
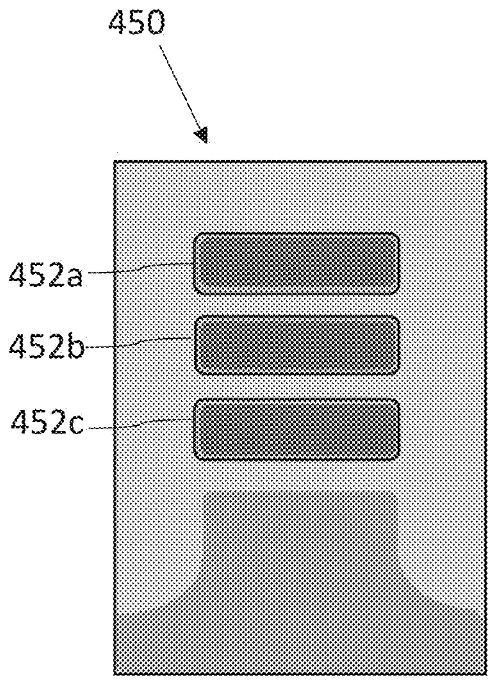
Figure 5:
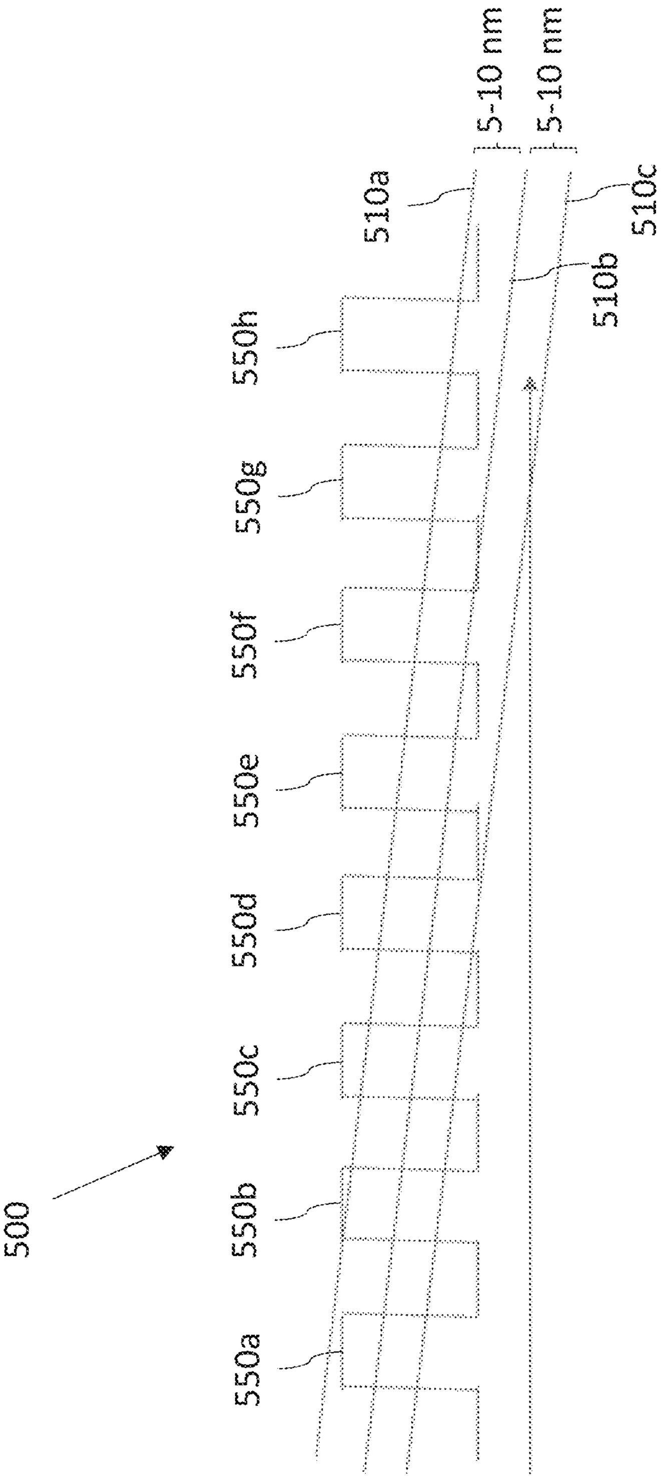
Figure 6:
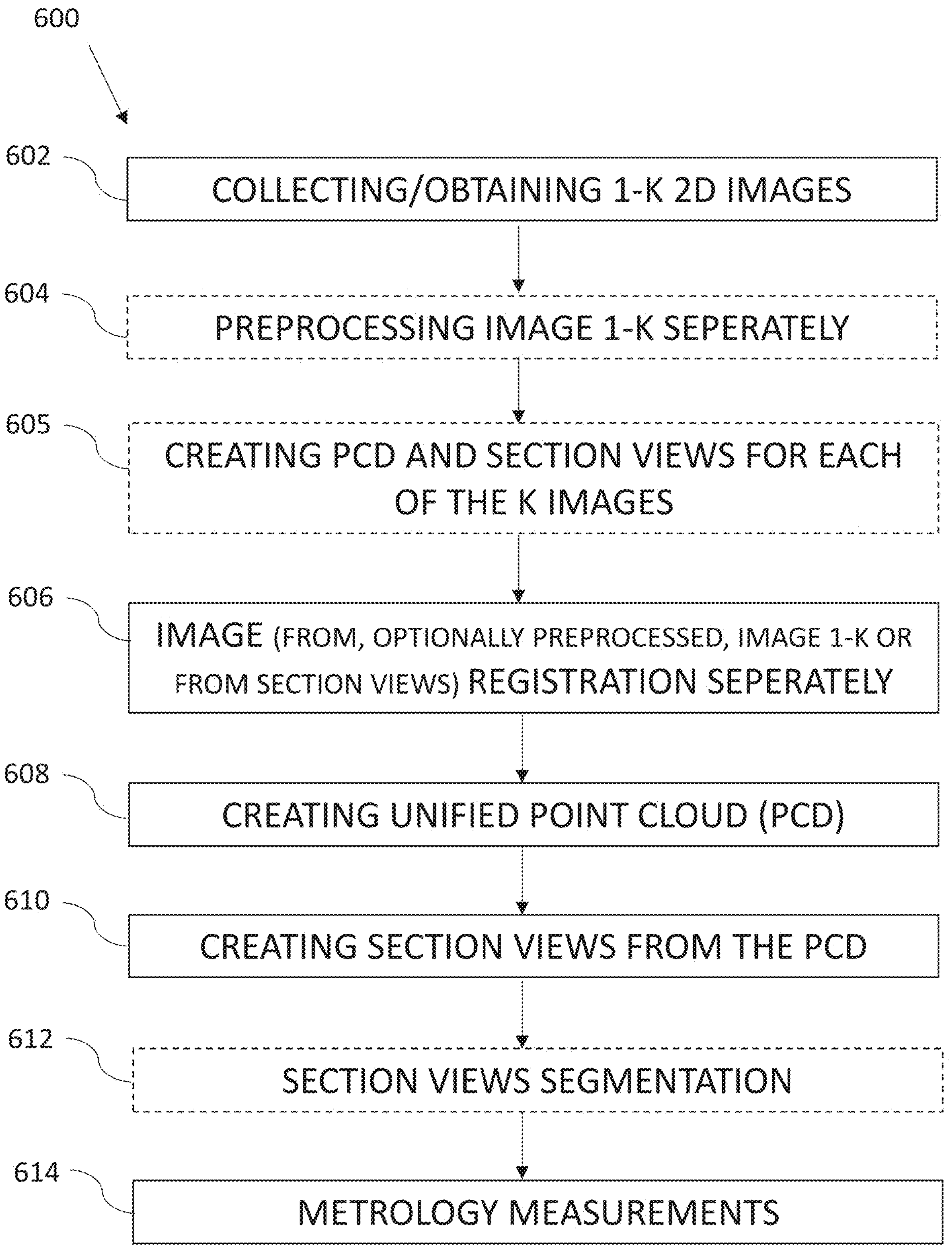

FIG. 1*a* schematically illustrates a section of a wafer cut diagonally such that its structural elements are cut a different heights thereof, according to some embodiments;

FIG. 1*b* is an exemplary 2D image of a diagonally cut wafer, according to some embodiments;

FIG. 2*a* illustratively depicts a section of a wafer diagonally cut (assuming the structure does not change in the hidden axis, the axis perpendicular to the 2 axes), according to some embodiments;

FIG. 2*b* illustratively depicts a top view of the diagonally cut wafer illustrated in of FIG. 2*a*, according to some embodiments;

FIG. 3 illustratively depicts the algorithmic flow of the wafer reconstruction and volumetric sampling, according to some embodiments;

FIG. 4*a* is an exemplary 2D image of a diagonally cut wafer, according to some embodiments;

FIG. 4*b* illustratively depicts the creation of a 3D point cloud based on the 2D cut image of FIG. 3*a*, according to some embodiments;

FIG. 4*c* is an exemplary 3D point cloud obtained from the image of the 2D image of FIG. 4*a*, according to some embodiments;

FIG. 4*d* illustratively depicts the reconstruction process of a section view 2D image from the 3D point cloud (PCD) and grey levels thereof, according to some embodiments;

FIG. 4*e* illustratively depicts a reconstructed section view obtained from FIG. 4*a*, according to some embodiments;

FIG. 4*f* illustratively depicts image segmentation performed on the section view obtained of FIG. 4*b*, according to some embodiments;

FIG. 5 illustratively depicts delayering of a periodic wafer, according to some embodiments; and FIG. 6 illustratively depicts the algorithmic flow of the wafer reconstruction and volumetric sampling of a periodic wafer including delayering of the wafer by multiple diagonal cuts for elevating reconstruction resolution, according to some embodiments.

DETAILED DESCRIPTION OF THE INVENTION

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

As used herein, the term "diagonal angle" refers to the angle of incidence, between an incident beam and a sample surface. According to some embodiments, the diagonal angle is in a range of about is about 5°-30° or about 10°-25°.

As used herein, the terms "compound angle" and "3D angle" refer to an angle generated by rotation of a plane in 3D around an axis which is not necessarily parallel to the main axes.

As used herein, the terms "cutting" and "milling" may be used interchangeably and refer to the exposure of internal layers of a structural element.

As used herein, the term "site" may refer to an area of a wafer. According to some embodiments, the term site may refer to a chip of a wafer. According to some embodiments, the terms "site" and "area" may be used interchangeably.

As used herein the term "subset of sites" may refer to a small number of arrays (e.g., 1, 2, 3, 5, or 10 chips) sacrificed for volumetric sampling and/or inspection.

As used herein, the term "point cloud" refers to a collection of data points defined in a three-dimensional coordinate system, where each point represents the spatial coordinates (x, y, and z) of a specific location on the surface of an object or within a scene. The data points can also include additional information such as color, intensity, or other attributes. Point clouds are frequently used to create highly detailed 3D models of real-world objects or environments.

As used herein, the term "metrology" and "wafer metrology" may be used interchangeably and refer to the precise measurement and analysis of various parameters on semiconductor wafers, used in the production of integrated circuits and microelectronic devices. Key aspects of wafer metrology include measuring parameters, such as, but not limited to wafer thickness, surface roughness, film thickness, and composition. According to some embodiments, wafer metrology refers to measuring parameters of structural components on the wafer, such as, but not limited to, transistors. According to some embodiments, wafer metrology includes critical dimension measurement to ensure the accuracy of features, overlay measurement for proper alignment between layers, and defect inspection to identify and analyze any imperfections on the wafer surface. According to some embodiments, the metrology may be volumetric sampling of a wafer, i.e., inspection of the wafer at a 3D resolution.

Top View Imaging after Diagonal Cut:

Reference is now made to FIG. 1*a*, which schematically illustrates a section of a wafer 100 cut diagonally (as illustrated by plane 101) at a diagonal angle α, such that its structural elements 105 are cut a different heights thereof, according to some embodiments. x-y-z represents the coordinates of the cutting system and x' and y' represent the coordinates of the structure (image) system. According to some embodiments, the cut may be performed using a focused ion beam (FIB), by a laser beam or any other appropriate tool.

Reference is now made to FIG. 1*b*, which is an illustration 110 of a diagonally cut wafer, such as wafer 100 represented in FIG. 1*a*, according to some embodiments. The constant depth lines are represented by dashed lines 112*a* and 112*b*. Below dashed line 112*b*, bulk silicon 114 is seen, while dashed line 112*a* represents the height of the deposition material 115, when uncut. According to some embodiments, the imaging may be scanning electron microscope (SEM), a (AFM, EDX or any other imaging tool) or any other appropriate imaging tool.

Reference is now made to FIG. 2*a*, which illustratively depicts a section of a wafer 200, cut along a diagonal line 201, such that layers 212-228 of the structural elements of the wafer, cut by the diagonal cut, are exposed. FIG. 2*b* illustratively shows a 2D top view (illustrated by arrow 205) image of the diagonally cut wafer 200, depicting layers (depths) 212'-228', according to some embodiments.

According to some embodiments, the images captured (FIG. 2*b* is an example of such image) may be preprocessed prior to undergoing further analysis. According to some embodiments, the preprocessing may include artifact removal, noise reduction, contrast enhancement, resolution adjustment, background subtraction, segmentation (also optionally performed later) and/or any combinations thereof. Each possibility is a separate embodiment.

Outline of Algorithm Flow:

Reference is now made to FIG. 3 which illustratively depicts the algorithmic flow 300 of the herein disclosed method for wafer reconstruction and volumetric sampling, according to some embodiments. It is understood that while all steps of the methods are shown to be sequential, some steps may be performed in parallel or in opposite order. One of ordinary skill in the art will readily understand, which steps require sequential execution and which not. It is also understood that some of the steps may be optional (as indicated below).

The steps of flow 300 may include:

Step 310: Collecting/obtaining data using a 2D imaging tool (e.g., SEM). According to some embodiments, the images may be FIB-SEM images, i.e., SEM images of a wafer cut diagonally using FIB, however other type of imaging and/or other tools for cutting the wafer diagonally are also envisaged and as such within the scope of this disclosure.

Step 320: (Optional): Preprocessing the collected image in order to increase image quality, resize, rotate, etc. The main goal of this step is to bring the input image into a standard format for example standard SNR, standard rotation angle, etc.

Step 330: Creating 3D point cloud (PCD).

Step 340: Creating section view from the PCD according to desired specifications (e.g., YZ axes, according X=50-60 nm.)

Step 350: (Optional): Performing image segmentation to separate relevant areas (e.g., nano sheets).

Step 360: (Optional): Perform volumetric measurements on the section view images and or on the image segments (e.g., width of nanosheet).

According to some embodiments, flow 300 may include a step at which volumetric measurements are carried out directly on the preprocessed image, obtained in step 310. According to some embodiments, the volumetric sampling may include statistical volumetric measurements on unfolded data, such as but not limited to width. A non-limiting example can be the pitch of the structure in some axis (e.g., X axis). Another non limiting example can be to perform geometry measurements of structure. For example, the thickness of several structures in the image can be measured and 2nd order statistic (i.e., mean and std) be computed.

Point Cloud Creation:

Once the 2D image(s) is ready a 3D point cloud (PCD) is created.

Reference is now made to FIG. 4*a* to FIG. 4*c* which demonstrate the conversion of a 2D image to a 3D point cloud, according to some embodiments. FIG. 4*a* shows an illustrative 2D image 400 of a diagonally cut wafer, according to some embodiments. White dashed lines 401*a*-401*g* are equal height lines. The x, y and z-coordinate can be calculated based on: the x'- and y'-coordinates of the pixel in the image (FIG. 4*b*), clipping in the size of the pitch, and the geometry of the plane of the cut, thus enabling generation of a 3D point-cloud, as illustrated in FIG. 4*c*, and a prior knowledge of image parameters, such as the expected locations of the equal-height lines. according to some embodiments. $j_x$ represents the change in the z-axis value obtained when X changes in pitch $P_x$. $j_y$ represents the change in the z-axis value obtained when Y changes in pitch $P_y$. According to some embodiments, prior knowledge such as the diagonal angle, the compound angle or the location of the equal height lines may be used to calculate the position of each 2D pixel in the 3D point cloud.

With regards to FIG. 4*c*, illustrating a 3D PCD, the point intensity may be set according to indicate the GL obtained at the coordinates of X,Y,Z. Black points are not allocated.

Advantageously, the PCD can be rotated according to a desired axis, thus providing an indication on how a section view would look like in this axis.

Section View Creation:

Reference is now made to FIG. 4*d*.

Since the PCD may include millions of pixels, creating section views, directly from the PCD would be time consuming and require a high computational load. Therefore, during creation of the section view images, an indexing stage may optionally be used prior to the creation itself. During this optional stage, a 3D mesh may optionally be applied to index the PCD into uniform structures with coarse resolution (e.g., 2-5 nm), as exemplified in FIG. 4*d*.

A non-limiting example of the coordinates of each point in the PCD and its respective grey level (GL) are shown in the left side table denoted 402. The PCD points are then sorted with a 3D mesh. Accordingly, the black dots 406 in mesh 404 represent points of the PCD distributed within the cells of mesh 404. For example, points number 1, 4, 15 and 266 (of the table) are all assigned to a same cell of mesh 404, whereas another cell contains only points number 7 and 12.

For each certain section view (SV) pixel, such as pixel 408, here denoted with an X, a sphere 410 (or other volume), having SV pixel 408 in its center, is created. It is understood that sphere 410 encompasses only a subsection of the cells, also referred to as "relevant mesh cells" 412, as indicated by the shading of mesh 404. Only PCD points (black dots), that fall within sphere 410, here denoted with 414, are taken into consideration in order to determine the GL of SV pixel 408, where GL=F(SV_x, SV_y, SV_z, PcdX,PcdY,pcdZ, PcdGL). F is a function that gets the desired SV pixel coordinates, and the PCD points inside sphere 410, and outputs the calculated GL, for example, linear interpolation (linear interp.) or any other appropriate function.

In this way, GL calculation in the SV is only based on a small subset of points in the PCD located near the desired pixel, thus reducing the computational load.

According to some embodiments, sphere 410 may for example have a diameter of 2-5 nm. It is understood that the selection of a relatively small neighborhood (e.g., a sphere of 2-5 nm) is typically preferable, in order to avoid long range effects or process variation effects. As mentioned above, this also allows to reduce the computational time and power.

Reference is now made to FIG. 4*e* which illustratively depicts a reconstructed section view (also referred to as a "section view" 450 obtained from the calculations of the GL of each of the SV pixels, such as SV pixel 408, as described with regards to FIG. 4*d*, according to some embodiments.

Image segmentation:

Image segmentation may be performed on section view 450 (shown in FIG. 4*e*), thereby facilitating measurements on segments of the structure, such as segments 452*a*-452*c*, as shown in FIG. 4*f*. According to some embodiments, the segmentation includes coarse segmentation. According to some embodiments, the coarse segmentation may be performed using standard image segmentation algorithms. Non limiting examples can be segmentation using edge detection (e.g., Canny edge detector) and fit a closed shape (of the detected lines) to some function, e.g., rectangular. Also, AI algorithms can be used to segment the image. According to some embodiments, the segmentation includes fine/deep segmentation.

Volumetric Measurements:

According to some embodiments, a variety of volumetric and statistical measurements can then be performed on the reconstructed section view, such as section view 450 and or parts thereof. Non limiting examples can be to measure thickness and width of each segments 452*a*-452*c* in FIG. 4*f* According to some embodiments, volumetric and statistical measurements can also be made on the raw 2D input image (e.g., input SEM image) and/or on the PCD and/or on a virtual 3D model of the structure generated from the PCD.

Delayering:

According to some embodiments, the images obtained may include images captured after more than one round of diagonal cuts (e.g., 2, 3.4, 5 or more), also referred to herein as "delayering" of the wafer i.e., obtaining multiple images from several cuts of the same field of view (FOV).

According to some embodiments, the delayering may be performed to increase the resolution of the reconstruction of a wafer including periodic structural elements 500, as illustrated in FIG. 5. This since, a same height may be imaged multiple times, thereby increasing z-resolution. For example, a certain layer may be exposed as a result of a first diagonal cut 510*a* (out of diagonal cuts 510*a*-510*c*) of structural element 550*f* (out of structural elements 550*a*-550*h*), and again as a result of a diagonal cut 510*b* (out of diagonal cuts 510*a*-510*c*) of structural element 550*b* (out of structural elements 550*a*-550*h*).

The point cloud in this case thus includes far more pixels as it includes all the 2D coordinates of all pixels in the 2D images obtained after each diagonal cut.

Algorithmic Flow for Delayering:

Reference is now made to FIG. 6, which illustratively depicts the algorithmic flow 600 of the herein disclosed method for high resolution wafer reconstruction and volumetric sampling of a periodic wafer, according to some embodiments. It is understood that while all steps of the methods are shown to be sequential, some steps may be performed in parallel or in an opposite order. One of ordinary skill in the art will readily understand, which steps require sequential execution and which not.

In step 602, an image is obtained after each of a plurality of diagonal cuts of the wafer, here illustratively shown as image1 to image k (more than one image of each cut is also a possibility). According to some embodiments, the images may be FIB SEM images, i.e., SEM images of a wafer cut diagonally multiple times using FIB, however other type of imaging and/or other tools for cutting the wafer diagonally are also envisaged and as such within the scope of this disclosure.

In steps 604, images 1-k may optionally be separately preprocessed, for example by artifact removal, noise reduction, contrast enhancement, resolution adjustment, background subtraction, and/or segmentation.

In optional step 605, a PCD for each of the images 1 to k is created and section view images computed.

In step 606 images (either the (optionally preprocessed) images 1-k (obtained in step 602 or 604) or the section views (obtained in step 605)) may be registered to align the structural elements therein, for example by using marks located on the wafer (for example manual marks), cross correlation (algorithmic correlation between images), and/or navigation data for each image (what x,y the images were taken), or other method incorporates algorithm or prior knowledge user info.

In step 608 a unified point cloud (PCD) is generated from the registered images (1-k (raw or preprocessed) or section views) using the method disclosed herein, specifically as described herein with regards to FIG. 4*a*-FIG. 4*c*.

In step 610 section views are created (final creation of section views) from the unified PCD generated in step 608, as described herein, specifically with regards to FIG. 4*d* and FIG. 4*e*.

In step 612 the section views may undergo segmentation, as described herein with regards to FIG. 4*f* and in step 614, volumetric measurements may be performed on the section views and or the segments.

It is understood that the process described in FIG. 6 represents a possible but not exclusive embodiment. Other options for creating PCD from the 2D input image using the registration data are also encompassed by this disclosure.

As used herein, the term "substantially" may be used to specify that a first property, quantity, or parameter is close or equal to a second or a target property, quantity, or parameter. For example, a first object and a second object may be said to be of "substantially the same length", when a length of the first object measures at least 80% (or some other pre-defined threshold percentage) and no more than 120% (or some other pre-defined threshold percentage) of a length of the second object. In particular, the case wherein the first object is of the same length as the second object is also encompassed by the statement that the first object and the second object are of "substantially the same length".

According to some embodiments, the target quantity may refer to an optimal parameter, which may in principle be obtainable using mathematical optimization software. Accordingly, for example, a value assumed by a parameter may be said to be "substantially equal" to the maximum possible value assumable by the parameter, when the value of the parameter is equal to at least 80% (or some other pre-defined threshold percentage) of the maximum possible value. In particular, the case wherein the value of the parameter is equal to the maximum possible value is also encompassed by the statement that the value assumed by the parameter is "substantially equal" to the maximum possible value assumable by the parameter.

As used herein, the term "about" may be used to specify a value of a quantity or parameter (e.g., the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations in disclosed methods, according to some embodiments, may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims.

It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

What is claimed is:

1. A method for generating a representative 3D reconstruction, having a reconstruction resolution, of a plurality of periodic structural elements of a wafer, the method comprising:

obtaining a 2D image of a top view of the plurality of structural elements, cut diagonally in a compound angle allowing 3D volumetric sampling, such that each of the plurality of structural elements is cut at a different height thereof;

generating a point cloud based on 2D coordinates of each pixel in the 2D image and on one or more known parameters related to a plane of the diagonal cut relative to the plurality of structural elements, wherein each point in the point cloud represents at least a position of each pixel in a 3D space and a grey level (GL) thereof;

creating at least one GL reconstructed image of a section view of the point cloud by:

a. sorting the points in the point cloud along a 3D mesh with a resolution which is coarser than the reconstruction resolution;

b. for each pixel in the 2D image, finding closest surrounding points in the point cloud within a predefined radius; and c. calculating an output pixel GL, based on the surrounding points;

performing, on the at least one GL reconstructed image, one or more volumetric measurements to obtain a characterization of the plurality of structural elements and/or one or more components thereof; and generating the representative 3D reconstruction of the structural elements, based on the characterization.

2. The method of claim 1, further comprising segmenting the GL reconstructed image using an image analysis algorithm to identify one or more components of the plurality structural elements.

3. The method of claim 1, wherein obtaining the 2D image of the top view of the diagonal cut is performed using a scanning electron microscope, an atomic force microscope, or focused ion beam imaging.

4. The method of claim 1, wherein calculating the output pixel GL comprises linear interpolation between the closest surrounding points.

5. The method of claim 1, further comprising preprocessing the obtained 2D image and performing measurements thereon.

6. The method of claim 1, further comprising generating a 2D and/or 3D model of the plurality of structural elements, based on multiple section views derived from the point cloud.

7. The method of claim 1, wherein the one or more volumetric measurements comprise a width of a structure, a layer thickness, a height of a structure, a recess of a layer, a radius of a structure, an angle of a structure or any combination thereof.

8. The method of claim 1, further comprising determining a quality/attribute of a wafer production line, based on the volumetric measurements.

9. The method of claim 1, wherein the plurality of structural elements are cut diagonally at least twice, wherein each subsequent of the diagonal cuts is performed at a deeper plane than a preceding diagonal cut, and wherein obtaining the top view of the diagonal cut comprises obtaining a top view image after each diagonal cut.

10. The method of claim 9, wherein generating the point cloud is based on 2D coordinates of all pixels in the obtained 2D images of each diagonal cut.

11. The method of claim 10, wherein a distance between each of the diagonal cuts is between 5 nm and 10 nm.

12. The method of claim 9, further comprising cross-registration of the top view images of each of the diagonal cuts.

13. The method of claim 12, wherein the registration comprises utilizing one or more marks on the wafer, algorithmic correlation between the top view images, navigation data for each of the top view images or any combination thereof.

14. A system for generating a representative 3D reconstruction, having a reconstruction resolution, of a plurality of periodic structural elements of a wafer, the system comprising a processing circuitry configured to:

obtain a 2D image of a top view of the plurality of structural elements, cut diagonally in a compound angle allowing 3D volumetric sampling, such that each of the plurality of structural elements is cut at a different height thereof, generate a point cloud based on 2D coordinates of each pixel in the 2D image and on one or more known parameters related to a plane of the diagonal cut relative to the plurality of structural elements, wherein each point in the point cloud at least represents a position of each pixel in a 3D space, grey level (GL) thereof;

create at least one GL reconstructed image of a section view of the point cloud by:

a. sorting the points in the point cloud along a 3D mesh with a resolution which is coarser than the reconstruction resolution;

b. for each pixel in the 2D image, finding closest surrounding points in the point cloud within a predefined radius; and c. calculating an output pixel GL, based on the surrounding points; and perform, on the at least one GL reconstructed image, one or more volumetric measurements to characterize the plurality of structural elements or one or more components thereof;

generate the representative 3D reconstruction of the structural elements, based on the characterization.

* * * * *